United States Patent
Frisky

(10) Patent No.: US 10,392,282 B2
(45) Date of Patent: Aug. 27, 2019

(54) METHOD AND APPARATUS FOR ELECTROCOAGULATION

(76) Inventor: Sean Frisky, Regina Saskatchewan (CA)

( * ) Notice: Subject to any disclaimer, the term of this patent is extended or adjusted under 35 U.S.C. 154(b) by 1404 days.

(21) Appl. No.: 13/078,572

(22) Filed: Apr. 1, 2011

(65) Prior Publication Data
US 2011/0266203 A1 Nov. 3, 2011

(30) Foreign Application Priority Data

Apr. 1, 2010 (CA) .................................. 2698880
Dec. 20, 2010 (CA) .................................. 2726098

(51) Int. Cl.
| | | |
|---|---|---|
| C02F 9/00 | (2006.01) | |
| C02F 1/24 | (2006.01) | |
| C02F 1/463 | (2006.01) | |
| C02F 1/40 | (2006.01) | |

(52) U.S. Cl.
CPC .............. *C02F 9/00* (2013.01); *C02F 1/24* (2013.01); *C02F 1/40* (2013.01); *C02F 1/463* (2013.01); *C02F 2201/008* (2013.01)

(58) Field of Classification Search
CPC ........................................... C02F 2001/46171
See application file for complete search history.

(56) References Cited

U.S. PATENT DOCUMENTS

| | | | | |
|---|---|---|---|---|
| 4,872,959 A | * | 10/1989 | Herbst et al. | 205/566 |
| 5,635,040 A | * | 6/1997 | Bakhir | C02F 1/46109 204/260 |
| 6,306,280 B1 | * | 10/2001 | Reipa et al. | 205/413 |
| 6,391,184 B1 | * | 5/2002 | Orolin et al. | 205/687 |
| 6,488,835 B1 | * | 12/2002 | Powell | 205/744 |
| 6,613,217 B1 | * | 9/2003 | Gilmore | 205/755 |
| 2002/0040855 A1 | * | 4/2002 | Morkovsky et al. | 205/742 |
| 2004/0079650 A1 | * | 4/2004 | Morkovsky et al. | 205/742 |
| 2005/0230321 A1 | * | 10/2005 | Berrak et al. | 210/748 |
| 2006/0021942 A1 | * | 2/2006 | Bradley | 210/663 |
| 2009/0032446 A1 | * | 2/2009 | Wiemers et al. | 210/85 |

FOREIGN PATENT DOCUMENTS

WO WO 2010107503 A1 * 9/2010

* cited by examiner

*Primary Examiner* — Jonathan M Peo
(74) *Attorney, Agent, or Firm* — Standley Law Group LLP

(57) ABSTRACT

A water treatment system using electrocoagulation is provided. One of the stages of the water treatment is subjecting the water to electrocoagulation so that colloidal solids can be reduced, emulsions broken, and hydrocarbons and complex organics removed, without the application of substantial chemical substances to the contaminated water or even the use of any chemical substances. An electrocoagulation apparatus can comprise: a tank having a first end and a second end; a plurality of electrolytic cells provided in the tank, each electrolytic cell having at least one anode electrode and at least one cathode electrode defining an anode/cathode electrode pair; and a voltage supply connected to each electrolytic cell to supply a voltage across each anode/cathode pair.

22 Claims, 8 Drawing Sheets

METHOD AND APPARATUS FOR ELECTROCOAGULATION

This invention is in the field of waste water treatment systems and more particularly water treatment systems that use electrocoagulation as part of their water treatment process.

BACKGROUND

The impact of polluted water is an environmental problem for industries around the world and there is a growing need for scaled, decentralized water treatment plants. Many industrial and other processes create contaminated water that must be dealt with. Often this mean costly transport and disposal of the contaminated water. Even if the water is to be treated at a treatment facility to remove the contaminations, the water may have to first be transported to the facility for treatment. More recently, electrocoagulation has been used to treat water.

SUMMARY OF THE INVENTION

In a first aspect, an electrocoagulation apparatus for removing contaminants from water is provided. The apparatus comprises: a tank having a first end and a second end; a plurality of electrolytic cells provided in the tank, each electrolytic cell having at least one anode electrode and at least one cathode electrode defining an anode/cathode electrode pair; and a voltage supply connected to each electrolytic cell to supply a voltage across each anode/cathode pair.

In another aspect, a water treatment system using electrocoagulation is provided. A transport trailer containing a water treatment system is provided so that the water treatment system can be moved from site to site where water treatment is required. Once at a site, water can be treated by the water treatment system to improve its quality and availability for reuse. One of the stages of the water treatment is subjecting the water to electrocoagulation so that colloidal solids can be reduced, emulsions broken, and hydrocarbons and complex organics removed, without the application of substantial chemical substances to the contaminated water or even the use of any chemical substances.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
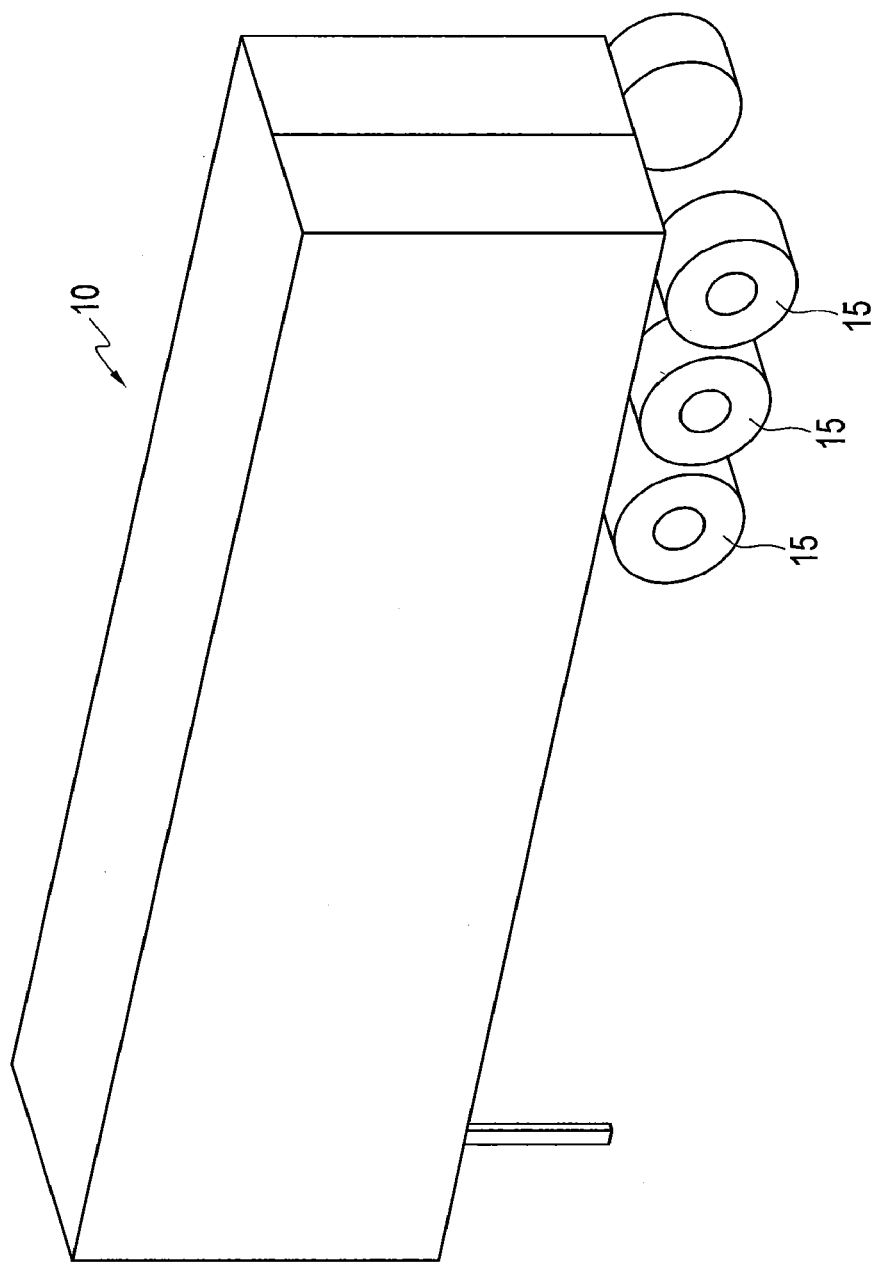
FIG. 1 is a perspective view of a transport trailer for housing and transporting a water treatment system.

FIG. 1 illustrates a transport trailer 10 for housing and transporting a water treatment system 100. The trailer 10 can have transport wheels 15 and a hitch mechanism (not shown) so that it can be towed behind a tow vehicle (not shown) and used to transport the water treatment system 100 to a treatment site where water is present to be treated.

The water treatment system 100 can then be used to treat water at the treatment site. Applications where the water treatment system 100 can be used include: emulsified water separation; cooling towers; ground water cleanup; industrial waste water; influent water quality control; metal recovery; potable water treatment; pretreatment for further water treatment such as reverse osmosis, ultrafiltration, nanofiltration, photocatalytics, etc; process rinse and wash water; beer effluent; radioactive isotope removal; sewage treatment; water reuse resulting in zero discharge; etc.

The water treatment system 100 can also be used in a number of industry processes including: oil and gas drilling to separate emulsified oil from water on site; steam cleaners to remove chrome, lead, zinc and other metals along with oil and grease that can be present in the water; pressure washers to remove heavy metals, oil, grease and suspended solids from the water being used; textile dye waters to separate dye from the water; metal plating process to remove metal from the plating rinse water tank; meat and poultry processing to harvest protein and fat previously from water used in the processing; recycling brine chiller water to destroy fecal coliform and separate fat, protein and suspended solids; commercial laundries to remove suspended solids and complex organics; mining operations to remove suspended particles of clay and coals fines from mine process water; and domestic sewage to remove suspended particles, bacteria, viruses and cysts; etc.

In one application, the water treatment system 100 can be used to treat water that has been used for fracing. The water treatment system 100 can be to used remove emulsified oil from the water and the water can then be reused for fracing.

Figure 2:
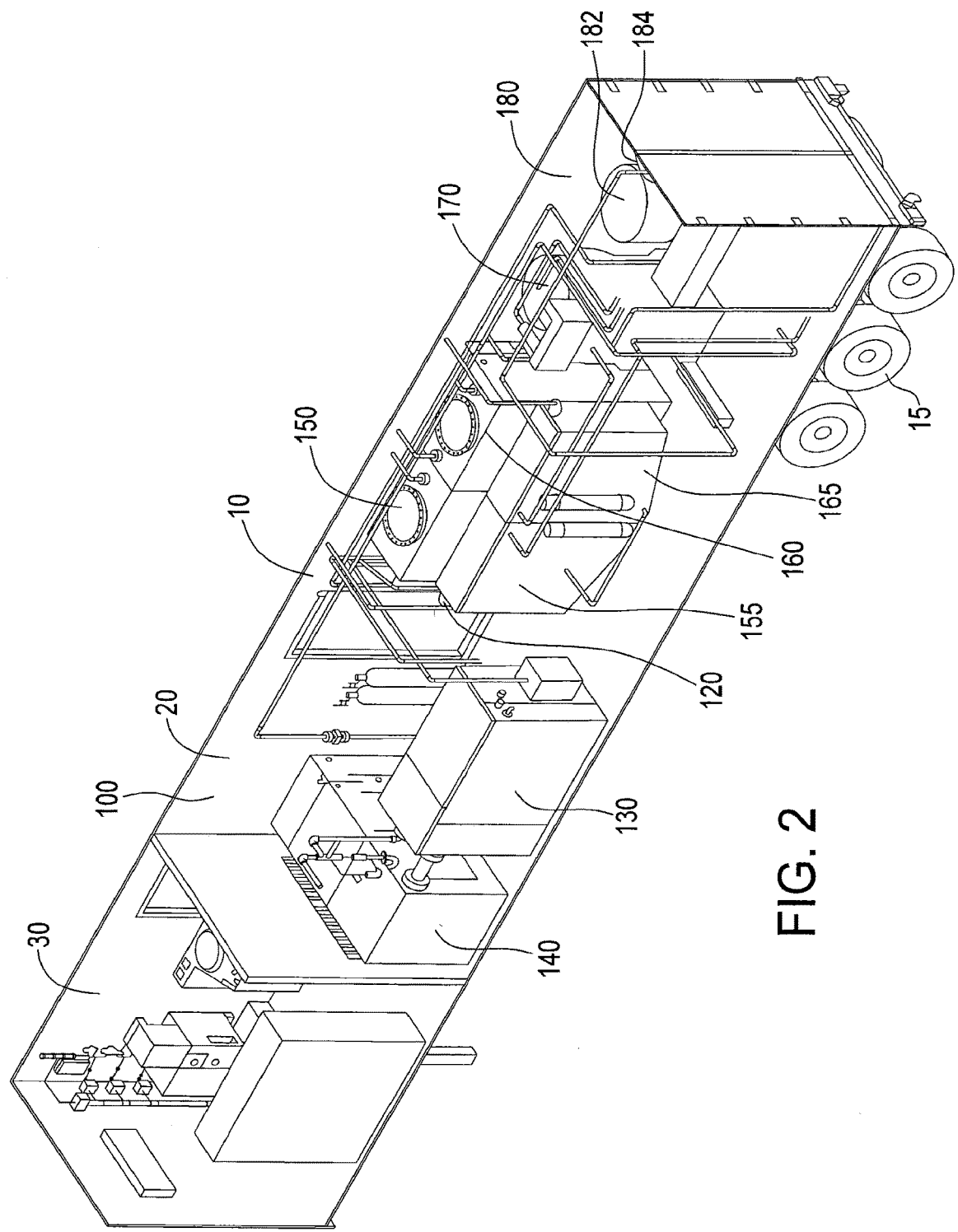
FIG. 2 is a perspective cutaway view of the transport trailer of FIG. 1 showing the water treatment system contained within.
Figure 3:
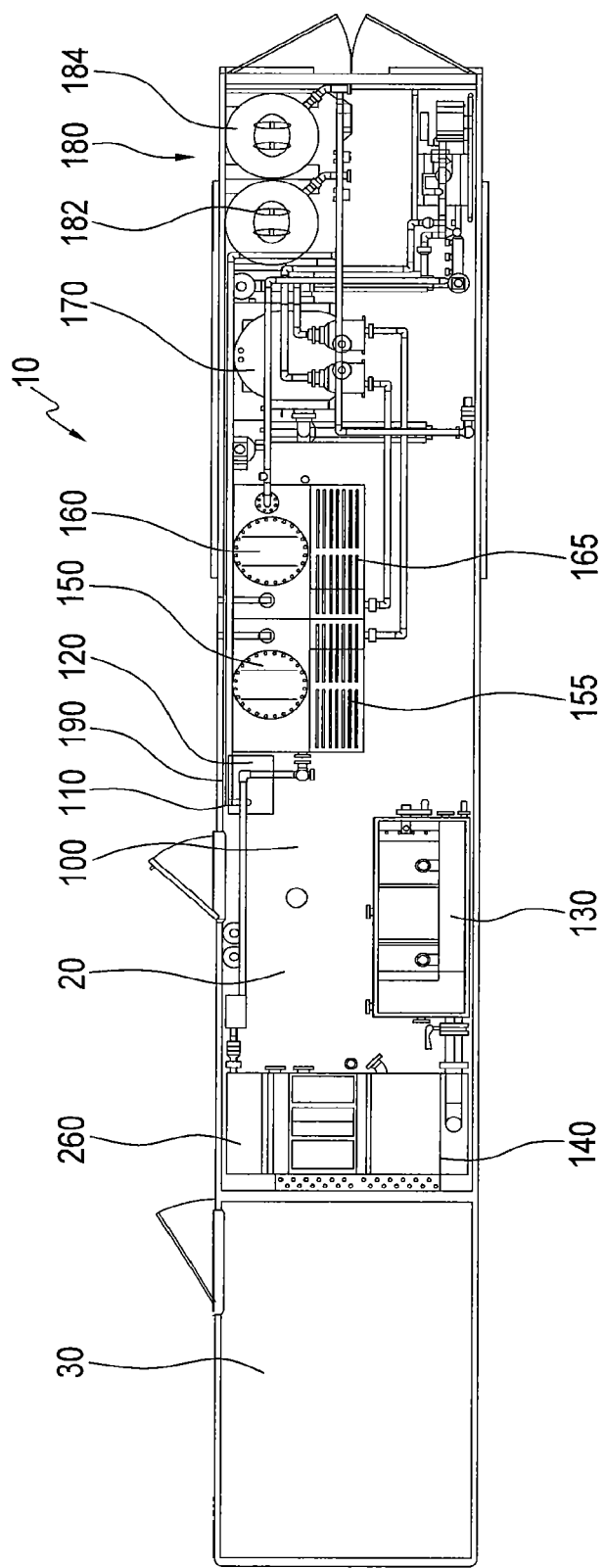
FIG. 3 is a schematic illustration of the water treatment system contained within the transport trailer of FIG. 1.

FIGS. 2 and 3 illustrate the water treatment system 100 carried within the trailer 10. The transport trailer 10 can be divided into a first enclosure 20 and a second enclosure 30. The first enclosure 20 can be used for enclosing the water treatment system 100 and can include insulated and reinforced walls to contain heat, gases, etc. released or potentially released by the water treatment system 100. The first enclosure 20 can also be designed to provide some blast protection should a fire or explosion occur in the water treatment system 100. The second enclosure 30 can be used for enclosing other components such as control systems, compressors, power supplies, ozone generators, etc.

The water treatment system 100 can include a water inlet 110; a screening unit 120; an oil water separator 130; an electrocoagulation module 140; a reactor chamber 150; a first filtration chamber 155; an ozone treatment chamber 160; a second filter treatment chamber 165; a vacuum chamber 170; a media treatment stage 180; and a water outlet 190.

The water inlet 110 allows contaminated water to be introduced into the water treatment system 100. From the water inlet 110 the water is passed through the screening unit 120. The screening unit 120 can contain a simple screening device to screen solid particles out of the incoming water.

The oil water separator 130 can be used to remove oil that is present in the water and that can be easily separated from the water. In one aspect, the oil water separator 130 can use diffused air flotation (DAF) where air is diffused into the water and causes some of the contaminants in the water to either float to the surface or settle out of the liquid to the bottom of the oil water separator 130 so that they can be removed from the water. In one aspect, coalescent media can also be added to the water in the oil water separator 130 to increase the efficiency of the separation occurring in the oil water separator 130.

Once the water has passed through the oil water separator 130, the water can be routed to the electrocoagulation module 140. The electrocoagulation module 140 operates using the principles of electrocoagulation to remove colloidal particles that are suspended in the water. The electrocoagulation module 140 is made up of a number of electrolytic cells with each cell comprising an anode and a cathode to form an anode/cathode pair. The water being treated is passed between the anode/cathode pairs and an electrical voltage is supplied across the anode/cathode pairs causing elecrocoagulation of contaminants, such as organic and inorganic colloid particles that are in solution in the water, breaking emulsions, etc.

Coagulation occurs by adding ions with opposite charges to a fluid containing particles suspended in the fluid. By adding ions that have opposite charges to the colloidal particles, the added oppositely charged ions can destabilize the colloids and coagulation can occur causing the colloids to precipitate out of the fluid. In chemical coagulation a suitable chemical substance such as Alum is added to the fluid being treated to cause the coagulation of the colloids. In electrocoagulation, coagulant is generated by electrolytic oxidation of the anodes when a power supply is connected across the anode/cathode electrode pairs. During the electrocoagulation, the positive electrodes undergo anodic reactions and release ions into the water. The released ions will neutralize the charges of the colloidal particles and initiate coagulation removing contaminants from the water. Unlike chemical coagulation, in electrocoagulation, additional chemicals do not need to be added to the water being treated.

After the water has passed through the electrocoagulation module 140, the water is passed to the reactor chamber 150. Because the different reactions caused by the electrocoagulation process performed in the electrocoagulation module 140 may take some time to occur and be completed, the water can be routed to the reactor chamber 150 where it can sit for a period of time. This can allow for the colloid particles to precipitate out of suspension with the liquid and allow the colloidal particles to coalesce. The contaminants precipitated out of the water can separate into a floating layer and a sediment layer.

Figure 4:
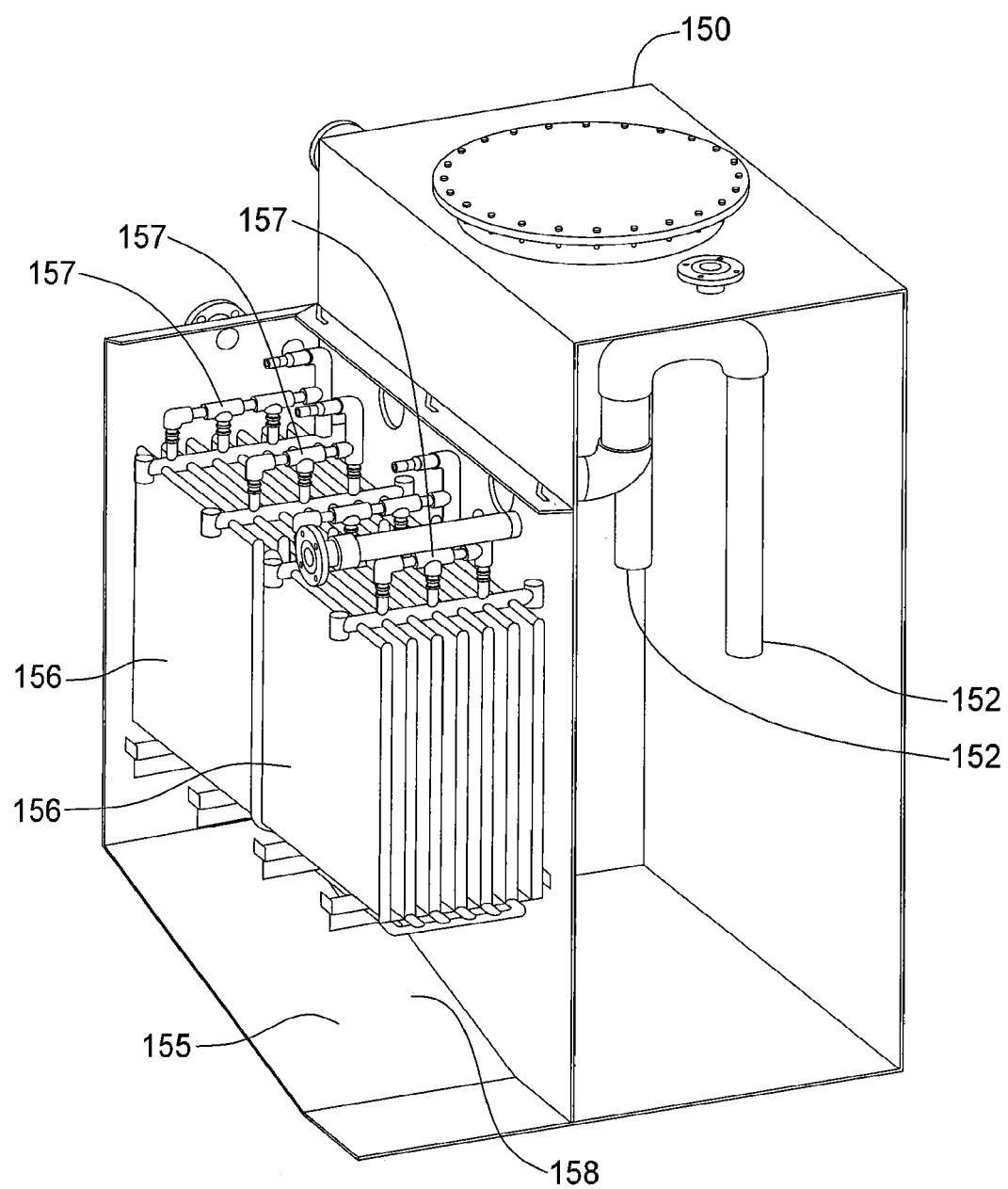
FIG. 4 is a schematic illustration of a reactor tank and a first filtration module.

FIG. 4 illustrates the reactor chamber 150 and the first filtration module 155 in one aspect. The reactor chamber 150 can define a collection container for the water being treated. An outlet 152 can remove water from reactor chamber 150 near a midpoint of the water contained within the reactor chamber 150. Some of the contaminants precipitated out of the water can separate into a floating layer which will be afloat near the top of the water in the reactor chamber 150 and some of the contaminants precipitated out of the water can settle and form a sediment layer near the bottom of the reactor chamber 150. Other contaminants that precipitate out of suspension with the water may form floc in the water. This floc may float in the water and may not form part of either the flotation layer or the sediment layer. By positioning the outlet 152 near the middle of the water in the reactor chamber 150 so that it is not positioned in either the floating layer or the sediment layer, the relatively clean water in the middle can be removed and transferred onto the next stage.

Referring again to FIGS. 2 and 3, water that has been removed from the reactor chamber 150 can be routed to the first filtration module 155. In the first filtration module 155, floc that has formed in the water from the reactions initiated by the electrocoagulation module 140 can be filtered out of the water. The first filtration module 155 can be any type of suitable filtration method that allows floc that has formed in the water from the electrocoagulation to be removed.

Referring to FIG. 4, in one aspect, the first filtration module 155 can be a nanofiber/vacuum filtration system. In this aspect, the first filtration module 155 can include a filtration chamber 158 for receiving the water from the reactor chamber 150. A number of nanofiber bundles 156 can be provided in the filtration chamber 158. The nanofiber bundles 156, used in conjunction with the vacuum source 170 (shown in FIGS. 2 and 3), can be used to separate floc from the water. Each nanofiber in the nanofiber bundles 156 can have an interior passage with a porous skin allowing water to be drawn through the nanofiber and into its interior passage. The vacuum source 170 is operably connected to each of the nanofibers in the nanofiber bundles 156 using manifolds 157 so that the vacuum source 170 can be used to create a vacuum in the interior passages of the nanofibers. By creating a vacuum in the interiors of the nanofibers, water from the filtration chamber 158 can be drawn through the porous nanofibers and into the interior passages of the nanofibers, where the water can be drawn through the interior passages of the nanofibers and out of the first filtration module 155. The porosity of the nanofibers is such that while water can be drawn through the nanofiber, floc that has formed in the water as a result of the electrocoagulation may not be able to pass through the nanofiber thereby leaving the floc behind in the filtration chamber 158 as the water is moved to the next stage in the water treatment system 100.

Referring again to FIGS. 2 and 3, water removed from the first filtration module 155 can be routed by the vacuum source 170 to the ozone treatment tank 160. Ozone can be injected into the water in the ozone treatment tank to kill any bacteria present in the water.

From the ozone treatment tank 160, the fluid can be passed to a second filtration module 165 where the bacteria killed by the ozone and other contaminants can be removed from the fluid. Similar to the first filtration module 155, in one aspect, the second filtration module 165 can be a nanofiber filter where the water is drawn into the nanofibers by creating a vacuum in the interior passages of the nanofiber leaving dead bacteria and other contaminants behind.

The water, once it has been removed from the second filtration module 165, can be passed through a media treatment stage 180 to remove various low level contaminants. In one aspect, the media treatment stage 180 can include a first stage 182 where the water is passed through a modified clay media and a second stage 184 where the water is passed through a coal media. Alternatively, the first stage 182 and the second stage 184 could contain granular carbon where the water is passed through each one in either series or parallel.

From the media treatment stage 180, the water can be passed to an outlet 190 where it can be collected, discarded, etc.

The water treatment system 100 may not remove salt from the water. However, in some cases, such as where the treated water will be reused for fracing an oil or gas well, a high salt concentration in the water is desired.

Figure 5:
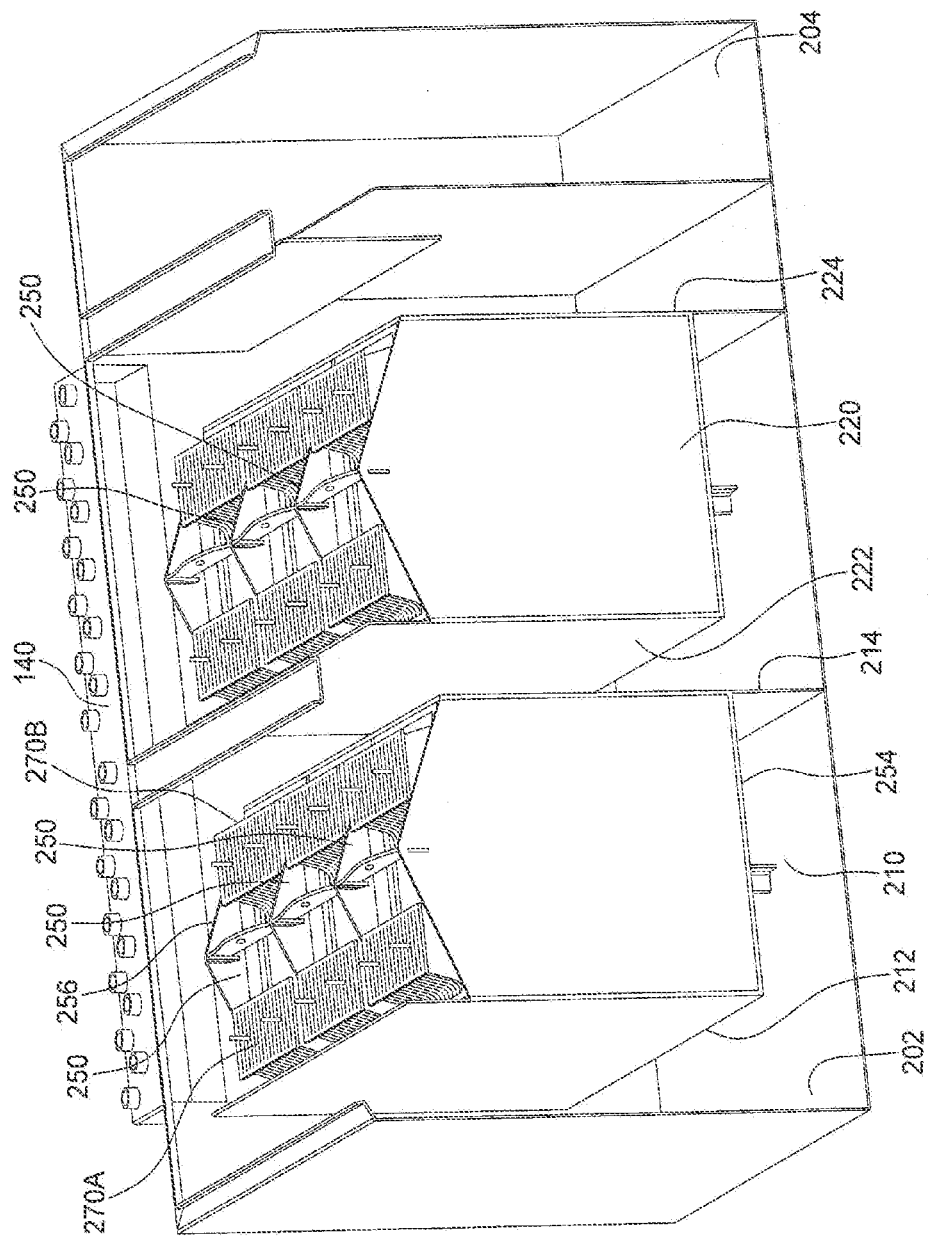
FIG. 5 is a schematic illustration of an electrocoagulation module in one aspect.

The electrocoagulation module 140 can be implemented in a number of different configurations, however, FIG. 5 illustrates the electrocoagulation module 140 in one aspect. The electrocoagulation module 140 can have a tank 142 with a first stage 210 and a second stage 220. Each stage 210, 220 can have a number of cells 250. Each cell 250 will have a number of parallel electrode plates 260, shown in FIG. 6, passing through the cell 250 and acting as anode/cathode electrode pairs when a voltage is supplied across the electrode plates 260.

Water to be treated can be introduced into the first end 202 of the electrocoagulation module 140 where a first stage baffle 212 will direct the water into the bottom 254 of the cells 250 in the first stage 210. A first baffle 212 will direct the water through the cells 250 in the first stage 210. A second baffle 214 is sized so that water that has reached the top 256 of the cells 250 in the first stage 210 can spill over the second baffle 214 where it will be directed to the cells 250 in the second stage 220 through the bottoms 254 of these cells 250 by a third baffle 222. A fourth baffle 224 can be sized so that water that has passed through the cells 250 in the second stage 220 will pass to the second end 204 of the electrocoagulation module 140 where it can be discharged from the electrocoagulation module 140.

A blanketing system can be used with the electrocoagulation module 140 to displace oxygen from the electrocoagulation module 140 using an inert gas, such as nitrogen, and create an oxygen deficient environment. The blanketing system can monitor the oxygen concentration in the electrocoagulation module 140 and pump inert gas into the tank to keep the electrocoagulation module 140 in an oxygen deficient state. If the electrocoagulation module 140 is not in an oxygen deficient state, the electrocoagulation module 140 can be locked out and prevented from operating.

Figure 6:
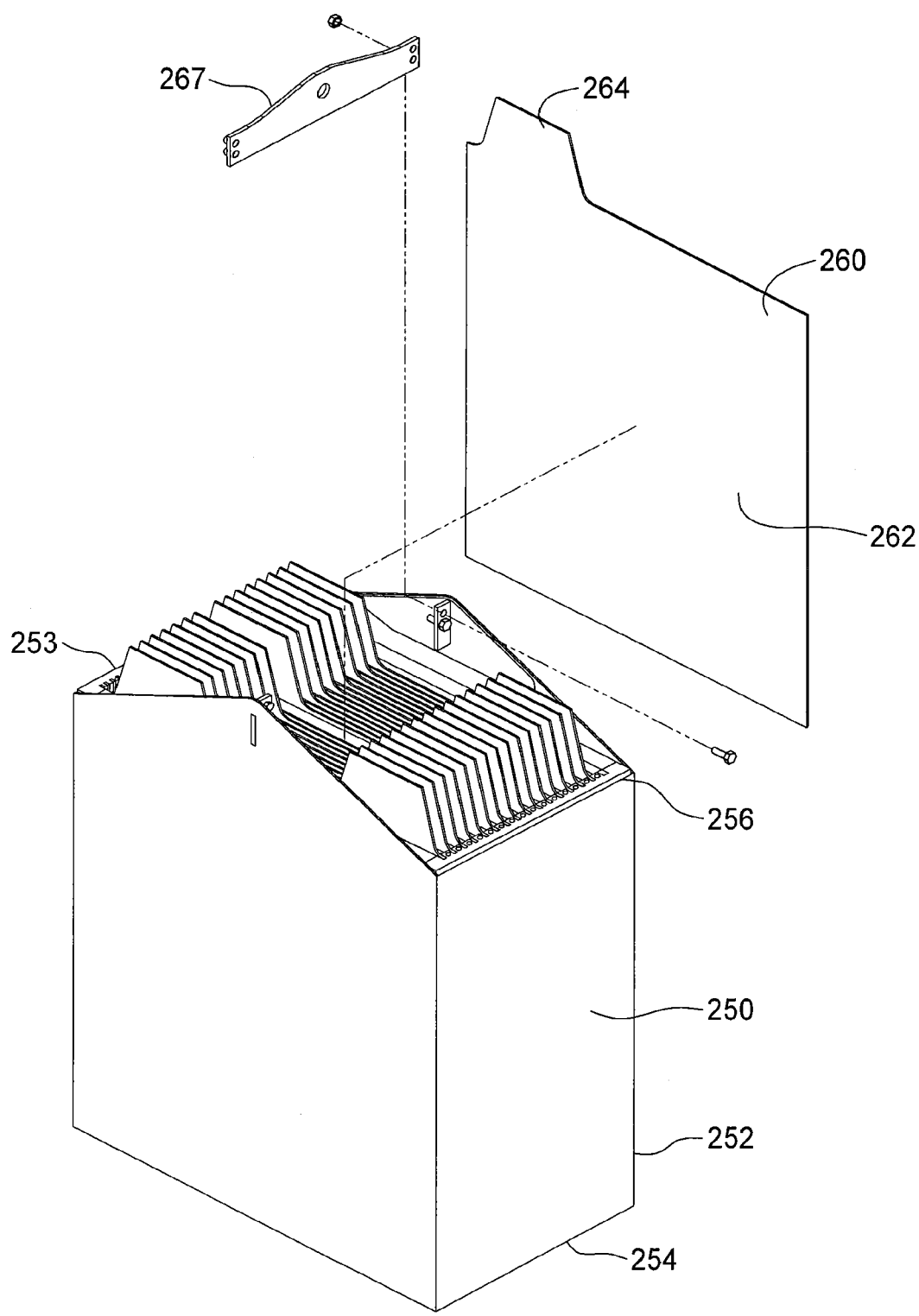
FIG. 6 is a schematic illustration of a cell used in the electrocoagulation module shown in FIG. 5.

FIG. 6 illustrates a single cell 250 used in the electrocoagulation module 140 shown in FIG. 5. The cell 250 can have a number of removable substantially parallel spaced-apart electrode plates 260 provided in an enclosure 252. The enclosure 252 can have a number of slots 253 provided in interior surfaces of the enclosure 252 to receive the electrode plates 260. With each slot 253 corresponding to a slot on an opposite interior surface of the enclosure 252. The slots 253 can be positioned so that edges of an electrode plate 260 can be positioned in two corresponding slots 253 and slid into place in the enclosure 252. A retention brace 267 can be used to hold the electrode plates 260 in position in the enclosure 252 and to provide an attachment point when the cell 250 is to be moved. The enclosure 252 can have an opening (not shown) in the bottom 254 of the enclosure 252 so that water can enter the cell 250 through the bottom 254 of the cell 250 and pass between the electrode plates 260 before exiting from a top 256 of the cell 250.

Each electrode plate 260 can have a tab 264 that extends above a body 262 of the electrode plate 260 so that when the electrode plate 260 is positioned in the enclosure 252 with the body 262 of the electrode plate 260 positioned substantially within the enclosure 252, the tab 264 can extend above the top 256 of the enclosure 252.

Each electrode plate 260 can be positioned in the enclosure 252 so that the tab 264 can be positioned on either a first side or a second side of the enclosure 252. In one aspect, the tabs 264 can be provided on the electrode plates 260 so that all of the electrode plates 260 positioned with their tabs 264 on the first side can have all of the tabs 264 aligned, while all of the electrode plates 260 positioned with their tabs 264 on the second side can have all of their tabs 264 aligned. By positioning alternating electrode plates 260 so that each electrode plate 260 has its tab 264 positioned on an opposite side from the adjacent electrode plates 260, the electrode plates 260 can be used to form anode/cathode electrode pairs. A first charge can be applied across all of the tabs 264 positioned on one side of the enclosure and a second charge, opposite to the first charge, can be applied across all of the tabs 264 positioned on the second side of the enclosure 252.

In one aspect, the tabs 264 to be positioned on a first side of the enclosure 252 can be placed in a different position than the tabs 264 to be positioned on a second side of the enclosure 252 so that if an electrode plate 260 is provided backwards in the enclosure 252, its tab 264 will not align with the other tabs 264 positioned on the same side. This can be useful if the anode electrodes are made of a different material than the cathode electrodes.

Referring to FIGS. 5 and 6, a first electrical connection 270A can be used to electrically connect all of the tabs 264 on the first side of the enclosure 252 and a second electrical connection 270B can be used to electrically connect the tabs 264 positioned on the second side of the enclosure 252. By applying opposite charges to the first electrical connection 270A and the second electrical connection 270B, the electrode plates 260 will act as anode/cathode electrode pairs.

The electrode plates 260 are typically formed of a conductive metal such as iron, aluminum, titanium, graphite, etc. The electrode plates 260 acting as the anodes will deteriorate as they are used and will eventually have to be replaced. When a cell 250 has been operated for some time and the electrode plates 260 acting as anodes have oxidized significantly, the electrode plates 260 can be removed from the enclosure 252 and replaced with new electrode plates 260. Additionally, if during the construction or use of the water treatment system 100 it is desired to switch the material of the anodes and/or cathodes, such as to target different contaminants, etc., the electrode plates 260 can be removed and be replaced with the desired material necessary.

In operation, water entering the electrocoagulation module 140 can pass through the first stage 210 and the cells 250 making up the first stage 210. The first baffle 212 will direct water that has entered the electrocoagulation module 140 through the cells 250 where the water will pass between the electrode plates 260 that have a voltage connected across them. As the water passes through the cells 250 in the first stage 210, contaminants in the water will be subjected to electrocoagulation.

Once the water has passed through the first stage 210, it can then pass over the second baffle 214 where it will be directed into the cells 250 in the second stage 220 by the third baffle 222. As the water passes through the cells 250 in the second stage 220 the water will pass through the electrode plates 260 that have a voltage applied across them subjecting the contaminants in the water to electrocoagulation.

After the water has passed through the cells 250 in the second stage 220, it can be directed to the second end 204 of the electrocoagulation module 140 where it can be discharged and routed to the next stage in the water treatment system 100.

The electrocoagulation process will vary depending on a number of factors including the amperage and voltage applied to the cells 250, as well as the total power input, current density, etc. Additionally, the electrocoagulation process will vary depending on the material that makes up the electrode plates 260 in the electrode cells 250. Different amperages, voltages, materials, etc. will be more or less efficient at removing specific contaminants from the water. By using a first stage 210 and a second stage 220, the operating characteristics and/or materials making up the cells 250 in the first stage 210 can be different than the operating characteristics and/or materials making up the cells 250 in the second stage 220, thereby allowing greater flexibility of the electrocoagulation module 140.

Figure 7:
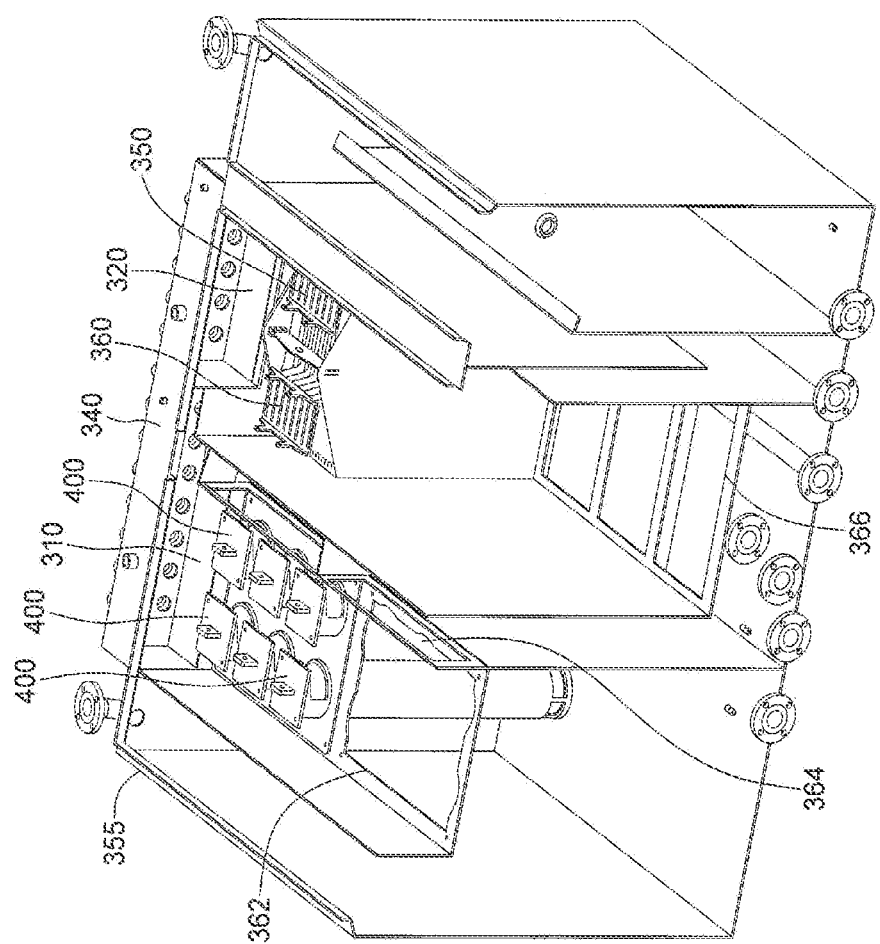
FIG. 7 is a schematic illustration of an electrocoagulation module in another aspect.

FIG. 7 illustrates an electrocoagulation module 340 in another aspect. Similar to the electrocoagulation module 140 shown in FIG. 5, the electrocoagulation module 340 can have a first stage 310 and a second stage 320 that water must pass through before it can exit the electrocoagulation module 340.

The second stage 320 can have a cell 350 similar to the cell 250 shown in FIG. 6 with a number of parallel electrode plates 360 passing through each cell 350 and acting as anode/cathode pairs when a voltage is supplied across the electrode plates 360.

The first stage 310 of the electrocoagulation module 340 can have a number of tubular cells 400 for inducing electrocoagulation in the water as it passes through the first stage 310.

Figure 8:
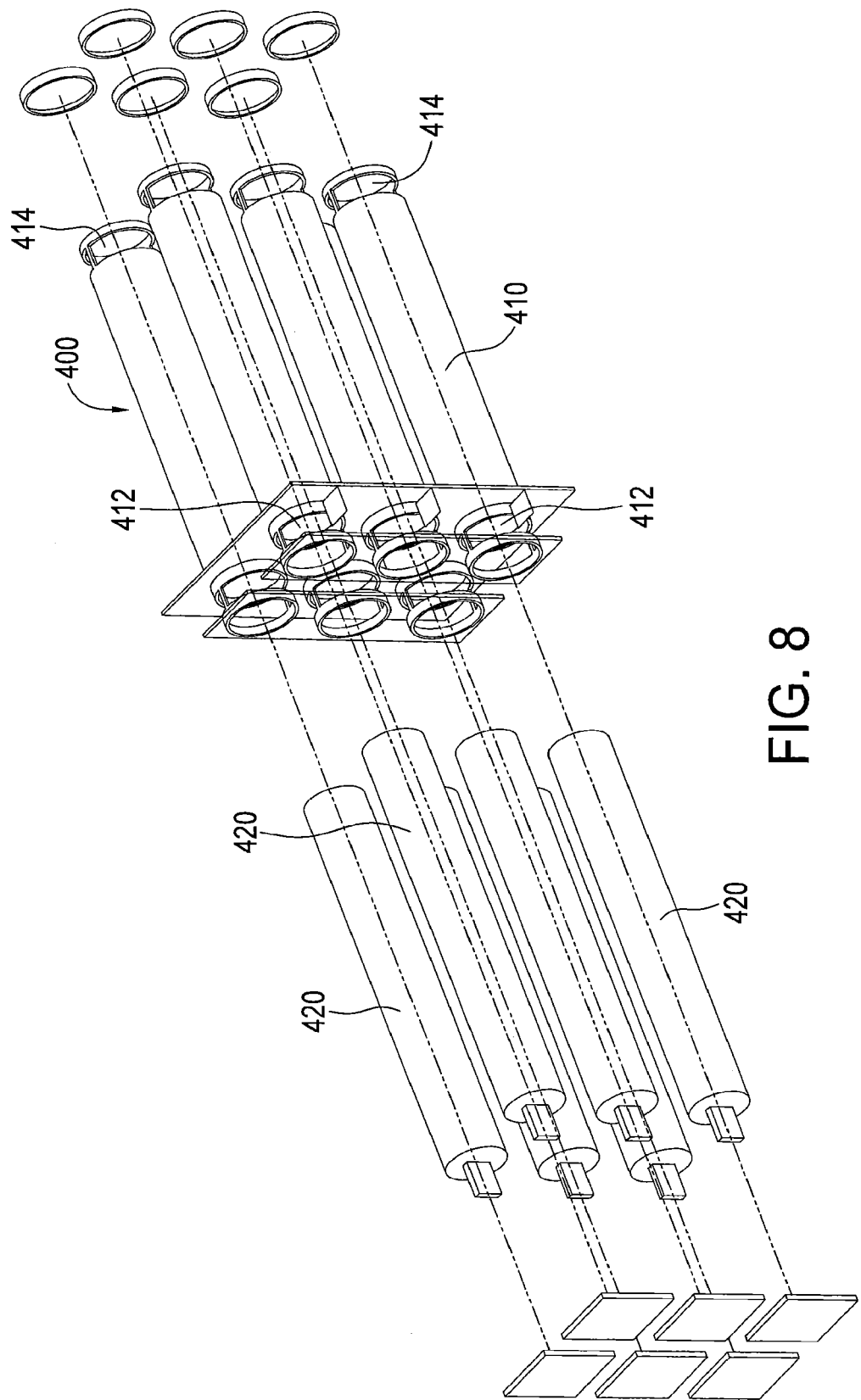
FIG. 8 is a schematic illustration of a tubular cell used in the electrocoagulation module shown in FIG. 7.

Referring to FIG. 8, an exploded view of a tubular cell 400 is shown. The tubular cell 400 can comprise an outer cylinder 410 and an inner cylinder 420. The outer cylinder 410 and the inner cylinder 420 can be sized so that an annulus is formed between the outer cylinder 410 and the inner cylinder 420. A voltage can be placed across the outer cylinder 410 and the inner cylinder 420 so that they act as electrodes, with one of them forming an anode and the other forming a cathode. Water in the annulus formed between the inner cylinder 420 and the outer cylinder 410 can then be subjected to the electric field created between the outer cylinder 410 and the inner cylinder 420 thereby subjecting the water to electrocoagulation. In one aspect, the outer cylinder 410 and the inner cylinder 420 can be formed of a metallic material. In one aspect, this metallic material can be a steel.

An inlet aperture 414 and an outlet aperture 412 can be provided passing through the outer cylinder 410 so that water can flow through the inlet aperture 414 into the annulus formed between the outer cylinder 410 and the inner cylinder 420. After the water has passed through the annulus the water can flow out of the outlet aperture 412 and out of the tubular cell 400. In one aspect, the inlet aperture 414 can be provided proximate a first end of the outer cylinder 410 and the outlet aperture 412 can be positioned proximate a second end of the outer cylinder 410. In this manner, water passing through the inlet aperture 414 into the annulus must flow along most of the length of the outer cylinder 410 and inner cylinder 420 before the water can exit through the outlet aperture 412 and exit the tubular cell 400, thereby subjecting the water to the electric field created between the outer cylinder 410 and the inner cylinder 420 for a longer period of time as it passes through the annulus thereby increasing the effect of the electrocoagulation.

Because one of either the outer cylinder 410 and the inner cylinder 420 will be a cathode and the other will act as an anode, the one acting as the anode will undergo anodic reactions and will electrochemically corrode. The tubular cell 400 can be removed from the electrocoagulation module 340 and either the outer cylinder 410 or the inner cylinder 420 (whichever is acting as the anode) replaced after it has been consumed over time. In this manner, the cylinder acting as the anode can be replaced as needed.

In one aspect, the tubular cell 400 can be configured so that the inner cylinder 420 is acting as the anode, preventing the outer cylinder 410 from being consumed during electrocoagulation.

Additionally, if during the construction or use of the electrocoagulation module 340 it is desired to target different contaminants, etc., the outer cylinder 410 and/or the inner cylinder 420 can be changed to an outer cylinder 410 and/or the inner cylinder 420 with different diameters to vary the size of the annulus formed between the outer cylinder 410 and the inner cylinder 420. By varying the size and/or thickness of the outer cylinder 410 and/or the inner cylinder 420 the size of the annulus can be varied for different situations.

In operation, water can be treated by electrocoagulation in the tubular cell 400. Water can be introduced into the tubular cell 410 through the inlet aperture 414 and into the annulus formed between the outer cylinder 410 and the inner cylinder 420. The water can then travel through the annulus towards the outlet aperture 412. As the water passes through the annulus it will be subjected to the electric field created between the outer cylinder 410 and the inner cylinder 420 and electrocoagulation will occur. The water will eventually exit the tubular cell 400 through the outlet aperture 412.

Referring again to FIG. 7, in operation, water entering the electrocoagulation module 340 can pass through the first stage 310 of the tubular cells 400 making up the first stage 310. Water can be introduced at an inlet end 355 of the electrocoagulation module 340 where it will be directed to a first stage 310 of the electrocoagulation module 340. A diverter plate 362 can be used to direct the water into the inlet apertures 414 of the tubular cells 400 in the first stage 310. Once the water has passed through the inlet apertures 414 of the tubular cells 400, it can pass through the annulus formed between the outer cylinder 410 and the inner cylinder 420 of the tubular cell 400. As the water passes through the annuluses of the tubular cells 400, contaminants in the water will be subjected to electrocoagulation.

Once the water reaches the outlet aperture 412 of the tubular cells 400 it can exit the tubular cells 400. In one aspect, the diverter plate 362 can be positioned between the inlet apertures 414 and the outlet apertures 412 of the tubular cell 400 so that the water must travel through the annuluses of the tubular cells 400 to reach the second stage 320 of the electrocoagulation module 340. An opening 364 can be provided so that water can pass from the first stage 310 of the electrocoagulation module 340 into the second stage 320.

In the second stage 320 a baffle 366 can be provided to direct the water into the cells 350 in the second stage 320 through the bottoms of these cells 350. A voltage provided across the water in the cells 350 can induce electrocoagulation in the water passing through the second stage 320.

After the water has passed through the second stage 320, the water can exit the electrocoagulation module 340.

The electrocoagulation process will vary depending on a number of factors including the amperage and voltage applied to the cells 400, 350, as well as the total power input, current density, etc. Additionally, the electrocoagulation process will vary depending on the materials used in the cells 400, 350. Different amperages, voltages, materials, etc. will be more or less efficient at removing specific contaminants from the water.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An electrocoagulation apparatus for removing contaminants from water, the apparatus comprising:
   a tank having a first end, a second end and side walls extending between the first end and the second end;
   a first plurality of electrolytic cells provided in the tank, the first plurality of electrolytic cells forming a first stage;
   a second plurality of electrolytic cells provided in the tank, the second plurality of electrolytic cells forming a second stage;
   a first baffle provided between the first end of the tank and the first plurality of electrolytic cells in the first stage, the first baffle positioned in the tank to direct water introduced into the tank at the first end through the electrolytic cells in the first stage;
   a second baffle provided between the first plurality of electrolytic cells in the first stage and the second plurality of electrolytic cells in the second stage, the second baffle positioned to prevent water in the first stage that has not passed through at least one of the first plurality of electrolytic cells in the first stage from entering the second plurality of electrolytic cells in the second stage;
   a voltage supply connected to each electrolytic cell, and
   a blanketing system operative to monitor the amount of oxygen in the tank and injecting an inert gas into the tank when the oxygen reaches a predetermined level;
   wherein each electrolytic cell comprises:
      an enclosure; and
      a plurality of substantially parallel spaced-apart electrode plates provided in the enclosure, each electrode plate oriented substantially parallel to the side walls,
   wherein the enclosure surrounds the plurality of substantially parallel spaced apart electrode plates, and wherein an opening is provided in a bottom of each enclosure, the opening positioned above a bottom of the tank, and wherein a top of each enclosure is open,
   wherein the voltage supply is connected across adjacent electrode plates to form anode/cathode electrode pairs,
   wherein each electrode plate has a main body and a tab extending above a portion of the main body, and
   wherein water entering the electrocoagulation apparatus at the first end will pass through the first baffle before passing through the first stage, then through the second baffle and then through the second stage before exiting the electrocoagulation apparatus at the second end.

2. The apparatus of claim 1 further comprising a third baffle provided between the second baffle and the electrolytic cells in the second stage, the third baffle positioned to direct water into the electrolytic cells in the second stage.

3. The apparatus of claim 2 further comprising a fourth baffle provided between the second stage of the electrolytic cells and the second end of the enclosure, the fourth baffle positioned to prevent water from exiting the second stage before is passes through one of the electrolytic cells in the second stage.

4. The apparatus of claim 1 wherein a plurality of slots are provided on an interior surface of each enclosure, each slot having a corresponding slot on an opposite interior surface of the enclosure and wherein the electrode plates are removably provided in the enclosure by inserting edges of each electrode plate in a pair of corresponding slots.

5. The apparatus of claim 1 wherein a retention brace is provided releasably connectable to a top of the enclosure to hold the electrode plates in the enclosure.

6. The apparatus of claim 1 wherein the tab of an electrode plate extends above a top of the enclosure when the electrode plate is inserted in the enclosure.

7. The apparatus of claim 1 wherein electrode plates to be used as anode electrodes have the tab in a different position relative to the main body than the tabs on the electrode plates to be used as cathode electrodes.

8. The apparatus of claim 1 wherein alternating electrode plates can be positioned so that the tab of each electrode plate is positioned on an opposite side from the adjacent electrode plates.

9. The apparatus of claim 8 wherein all of the tabs on the first side are connected to a first electrical connection and all of the tabs on the second side are connected to a second electrical connection.

10. A water treatment system comprising a water inlet; a water outlet; and the electrocoagulation apparatus of claim 1.

11. The system of claim 10 further comprising a screening unit for screening large particulate out of the water provided between the water inlet and the electrocoagulation apparatus.

12. The system of claim 10 further comprising an oil water separator between the water inlet and the electrocoagulation apparatus.

13. The system of claim 12 wherein the oil water separator is a diffused air floatation oil water separator.

14. The system of claim 10 further comprising a reactor chamber provided subsequent to the electrocoagulation apparatus to allow water that has passed through electrocoagulation apparatus to provide some dwell time, the reactor chamber having an outlet provided proximate a middle of the reactor chamber.

15. The system of claim 10 further comprising a filtration stage provided between the electrocoagulation apparatus and the water outlet.

16. The system of claim 15 wherein the filtration stage includes a nanofiber vacuum filtration system.

17. The system of claim 15 wherein the filtration stage includes an ozone treatment chamber.

18. The system of claim 15 wherein the filtration stage includes a media treatment tank.

19. The system of claim 10 wherein the system is provided on a trailer for transport.

20. The system of claim 19 wherein an enclosure is provided on the trailer enclosing the system.

21. The system of claim 19 wherein the trailer is divided into a first enclosure and a second enclosure wherein the water treatment system is provided within the first enclosure.

22. An electrocoagulation apparatus for removing contaminants from water, the apparatus comprising:
   a tank having a first end and a second end;
   a plurality of electrolytic cells provided in the tank, each electrolytic cell having at least one anode electrode and at least one cathode electrode defining an anode/cathode electrode pair; and
   a voltage supply connected to each electrolytic cell to supply a voltage across each anode/cathode pair,
   wherein at least one of the electrolytic cells comprises:
      an outer cylinder having an inlet aperture provided proximate a first end and an outlet aperture provided proximate a second end of the outer cylinder, the first end and the second end being on opposite ends of the outer cylinder;

an inner cylinder provided inside the outer cylinder; and an annulus formed between the outer cylinder and the inner cylinder;

wherein the voltage supply is provided across the outer cylinder and the inner cylinder to create a voltage across the annulus and form a anode/cathode electrode pair with the inner cylinder and the outer cylinder, and wherein the outer cylinder is positioned substantially vertically in the tank so that water that enters the annulus through the inlet aperture must travel upwards through the annulus formed between the outer cylinder and the inner cylinder and along a length of the outer cylinder and a length of the inner cylinder before the water can exit the annulus through the outlet aperture.

* * * * *